US012139939B2

(12) United States Patent
Lasquete

(10) Patent No.: US 12,139,939 B2
(45) Date of Patent: Nov. 12, 2024

(54) HASP ASSEMBLY FOR A HIDDEN-SHACKLE PADLOCK

(71) Applicant: Verizon Patent and Licensing Inc., Basking Ridge, NJ (US)

(72) Inventor: John-Dominic Guillem Lasquete, Brentwood, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 409 days.

(21) Appl. No.: 17/651,603

(22) Filed: Feb. 18, 2022

(65) Prior Publication Data

US 2022/0170296 A1 Jun. 2, 2022

Related U.S. Application Data

(63) Continuation of application No. 16/563,460, filed on Sep. 6, 2019, now Pat. No. 11,274,472.

(60) Provisional application No. 62/850,200, filed on May 20, 2019.

(51) Int. Cl.
*E05B 67/38* (2006.01)

(52) U.S. Cl.
CPC .................................. *E05B 67/383* (2013.01)

(58) Field of Classification Search
CPC ........ E05B 67/36; E05B 67/38; E05B 67/386; E05B 67/383; E05B 13/001; E05B 13/002
See application file for complete search history.

(56) References Cited

U.S. PATENT DOCUMENTS

| | | | |
|---|---|---|---|
| 1,326,554 A | 12/1919 | Watson | |
| 1,554,592 A | 9/1925 | Olson | |
| 3,901,058 A | 8/1975 | Best | |
| 3,996,774 A | 12/1976 | Best | |
| 4,745,783 A | 5/1988 | Poe | |
| 5,174,135 A | 12/1992 | Loughlin | |
| 5,469,722 A | 11/1995 | Ellefsen | |
| 5,669,255 A | 9/1997 | Albano | |
| 5,946,952 A | 9/1999 | Mintchenko | |
| 6,467,317 B1 | 10/2002 | Hillabush et al. | |
| 6,925,842 B1 | 8/2005 | Hillabush et al. | |
| 7,162,898 B2 | 1/2007 | Gogel | |
| 7,543,466 B2 | 6/2009 | Loughlin et al. | |
| 7,562,546 B2 | 7/2009 | Taylor | |
| 7,610,784 B2 | 11/2009 | Rohde et al. | |
| 8,011,213 B1 | 9/2011 | Gogel | |
| 8,807,609 B2 * | 8/2014 | Stallbaumer .......... | E05B 13/001 292/336.3 |
| 9,284,753 B1 | 3/2016 | Catlin | |
| 2004/0011092 A1 | 1/2004 | Haczynski et al. | |
| 2005/0247084 A1 | 11/2005 | Rosenberg et al. | |
| 2005/0252257 A1 | 11/2005 | Woods et al. | |
| 2009/0217713 A1 | 9/2009 | Loughlin et al. | |
| 2010/0050711 A1 | 3/2010 | Davis | |
| 2014/0260445 A1 | 9/2014 | Vellani | |

(Continued)

*Primary Examiner* — Christine M Mills
*Assistant Examiner* — Yahya Sidky

(57) ABSTRACT

A hasp bracket may include a shield wall and a mounting plate orthogonal to the shield wall. The mounting plate may include a bolt aperture member extending from an inward edge of the mounting plate. The mounting plate may include one or more apertures in a surface of the mounting plate. The one or more apertures may be located in an area bounded by the shield wall and the inward edge of the mounting plate.

20 Claims, 7 Drawing Sheets

(56) References Cited

U.S. PATENT DOCUMENTS

| | | | | |
|---|---|---|---|---|
| 2017/0037662 | A1* | 2/2017 | Braun | E05B 67/383 |
| 2019/0051074 | A1 | 2/2019 | Ufkes et al. | |

* cited by examiner

HASP ASSEMBLY FOR A HIDDEN-SHACKLE PADLOCK

RELATED APPLICATIONS

This application is a continuation of U.S. patent application Ser. No. 16/563,460, entitled "HASP ASSEMBLY FOR A HIDDEN-SHACKLE PADLOCK," filed Sep. 6, 2019, which claims priority to U.S. Provisional Patent Application No. 62/850,200 ("HASP ASSEMBLY FOR A HIDDEN-SHACKLE PADLOCK"), filed on May 20, 2019, the contents of which are incorporated herein by reference in their entireties.

BACKGROUND

A hasp may be used with a padlock to prevent a door from being opened. A hasp may include a shackle aperture member (also referred to as a "staple") that receives a shackle of a padlock to secure the hasp, and thereby prevent opening of a door associated with the hasp.

DETAILED DESCRIPTION OF PREFERRED EMBODIMENTS

Figure 1A:
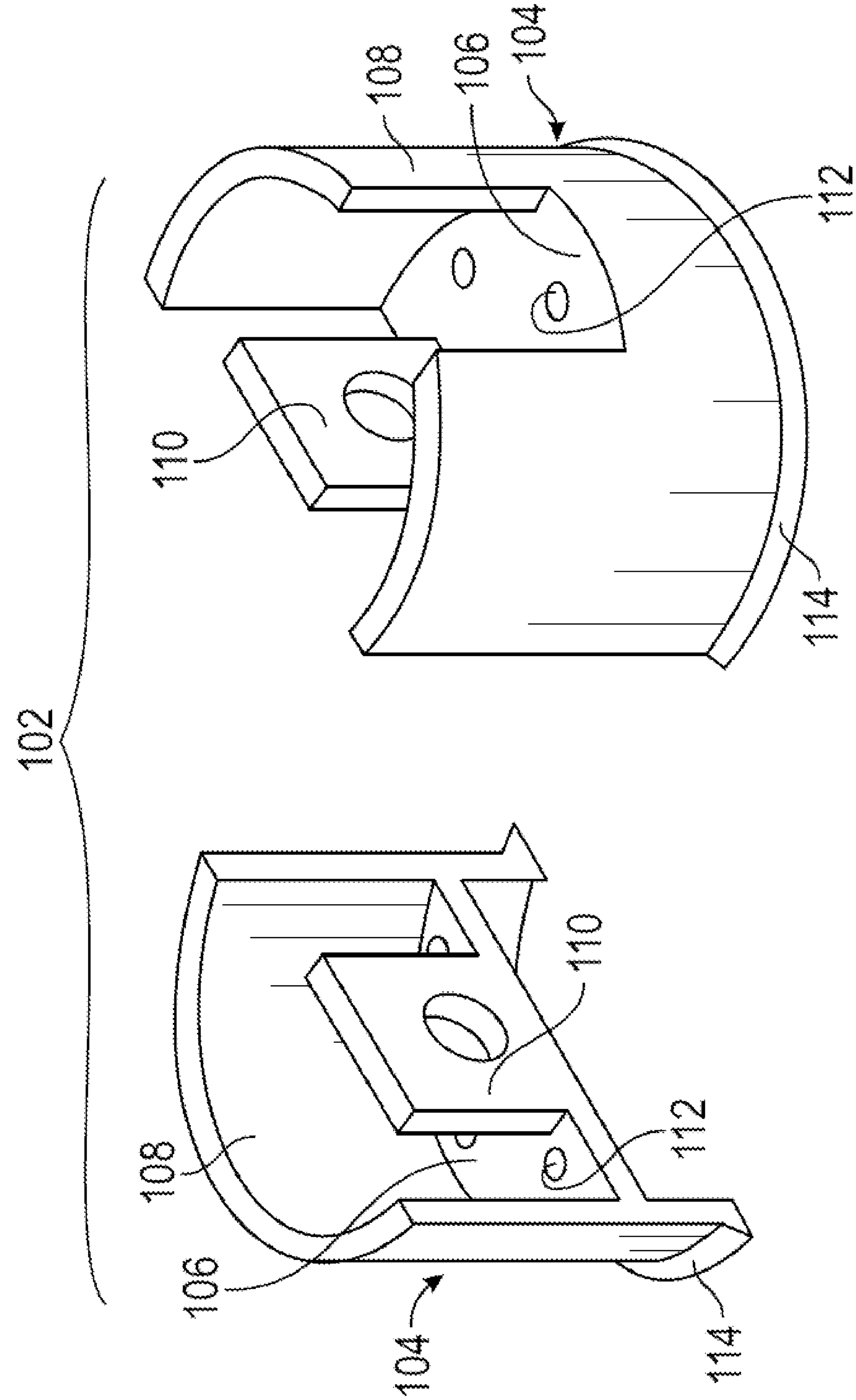
FIG. 1A is a diagram of a perspective view of a set of hasp brackets included in an example hasp assembly.

The following detailed description of example implementations refers to the accompanying drawings. The same reference numbers in different drawings may identify the same or similar elements.

A padlock may be used with a hasp that is mounted to a door (e.g., a cabinet door, a shed door, a vehicle door, and/or the like) in order to prevent unauthorized opening of the door. One type of padlock is a hidden-shackle padlock (commonly referred to as a "hockey puck padlock" or a "puck padlock") that employs a shackle that is protected by a housing. The hidden-shackle padlock may be used with a hasp assembly that includes two hasp brackets, each having a shackle aperture member and a shield wall. A first of the two hasp brackets may be mounted to a door and a second of the two hasp brackets may be mounted adjacent to the door (e.g., to a frame of the door or a wall adjacent the door), such that the shackle aperture members of the hasp assembly are aligned. The housing of the hidden-shackle padlock may include an aperture to permit the housing to be placed over the shackle aperture members of the hasp brackets, such that the hidden-shackle padlock is surrounded by (e.g., nested within) the shield walls of the hasp brackets. The shackle of the hidden-shackle padlock may be inserted into the housing via a gap in the shield walls and projected through the shackle aperture members of the hasp brackets to thereby secure the door.

Although the housing of the hidden-shackle padlock is designed to protect the shackle from tampering (e.g., by cutting, sawing, and/or the like), hidden-shackle padlocks remain susceptible to tampering and failure. For example, the housing may be breached by grinding and/or drilling, such that the shackle can be accessed and disabled. In addition, mounting hardware used to mount the hasp brackets is not protected and may be removed or disabled by grinding or drilling of the mounting hardware. Accordingly, current hidden-shackle padlocks can be circumvented, thereby permitting theft, vandalism, and/or damage of property.

Some implementations described herein provide an improved hasp assembly for a hidden-shackle padlock. The hasp assembly may include a set of hasp brackets. A hasp bracket of the hasp assembly may include a mounting plate and a shield wall extending from the mounting plate that defines a periphery of the hasp bracket. The mounting plate may include apertures that are to receive mounting hardware. In addition, the hasp bracket may include a cover plate that is attached to an edge of the shield wall and extends orthogonally to the shield wall.

By arranging the shield wall at a periphery of the hasp bracket, the shield wall provides protection to the mounting plate, and thereby provides protection to mounting hardware received in the mounting plate. For example, when a hidden-shackle padlock is secured to the hasp assembly and nested within the shield walls of the hasp brackets, the hidden-shackle padlock covers the mounting plate. In this way, the hidden-shackle padlock and the shield walls provide protection to the mounting hardware, thereby preventing or discouraging tampering with the mounting hardware. Furthermore, when the hidden-shackle padlock is secured to the hasp assembly and nested within the shield walls, the cover plate covers the hidden-shackle padlock. In this way, the cover plate provides protection to the hidden-shackle padlock, thereby preventing or discouraging tampering with the hidden-shackle padlock.

FIG. 1A is a diagram of a perspective view of a set of hasp brackets 104 included in an example hasp assembly 102. As shown in FIG. 1, hasp assembly 102 may include first and second hasp brackets 104. Hasp bracket 104 may include a mounting plate 106 and a shield wall 108. Hasp brackets 104 may be composed of steel (e.g., hardened steel) or another metal. Mounting plate 106 and shield wall 108 may form a single part (e.g., hasp bracket 104). For example, hasp bracket 104 may be cast to include mounting plate 106 and shield wall 108. As another example, mounting plate 106 may be welded, molded, or cast with shield wall 108 to form hasp bracket 104.

Mounting plate 106 may include a semicircle-shaped, semioval-shaped, or other geometric-shaped, surface. Mounting plate 106 may include a shackle aperture member 110 that extends from mounting plate 106. For example, shackle aperture member 110 may extend orthogonally from mounting plate 106. Shackle aperture member 110 may extend from an inward edge (e.g., a straight edge) of mounting plate 106. Thus, when hasp assembly 102 is in a locked configuration (e.g., by a hidden-shackle padlock), shackle aperture members 110 of hasp brackets 104 are adjacent and aligned (e.g., inward edges of hasp brackets 104 are adjacent and facing).

Mounting plate 106 may include one or more apertures 112 in a surface of mounting plate 106 (e.g., the one or more apertures 112 may extend from a first surface of mounting plate 106 to a second surface of mounting plate 106). Apertures 112 may receive mounting hardware (e.g., a screw, a bolt, a threaded rod, and/or the like) for mounting hasp bracket 104 to a surface (e.g., a door, a door frame, a wall, and/or the like). An aperture 112 may include threading on an inner surface of the aperture 112. In this way, a first end of a threaded rod may be joined to hasp bracket 104 at aperture 112 and may be secured (e.g., by a nut or by another fastener). Once joined, the threaded rod may be inserted into another aperture extending through a surface (e.g., a door, a wall, and/or the like) and secured (e.g., by a nut) at a second end to thereby mount hasp bracket 104 to the surface.

Shield wall 108 may extend from mounting plate 106 (e.g., in the same axial direction that shackle aperture member 110 extends from mounting plate 106). That is, shield wall 108 may be orthogonal to mounting plate 106 and surround a portion of mounting plate 106. Thus, shield wall 108 may define a periphery (e.g., boundary) of hasp bracket 104 (e.g., such that mounting plate 106 does not extend beyond the periphery defined by shield wall 108). For example, shield wall 108 may extend from (e.g., surround) an outward edge (e.g., a round edge) of mounting plate 106. Thus, when hasp assembly 102 is in a locked configuration (e.g., by a hidden-shackle padlock), shield walls 108 of hasp brackets 104 define a circular perimeter (e.g., an approximately circular perimeter). In this way, mounting plates 106 are located within the circular perimeter so that mounting hardware received in mounting plates 106 is protected from tampering.

In some implementations, a first hasp bracket 104 may have a continuous shield wall 108 and a second hasp bracket 104 may have a non-continuous shield wall 108. A non-continuous shield wall 108 may include a gap between sections of the shield wall 108. The gap permits insertion of a key into a hidden-shackle padlock engaged with hasp assembly 102 (e.g., engaged with shackle aperture members 110) to allow a shackle of the hidden-shackle paddle to be disengaged from shackle aperture members 110.

Shield wall 108 may have a lower edge (e.g., an edge that abuts a surface, such as a door or a wall, when hasp bracket 104 is in use) and an upper edge. Mounting plate 106 may be positioned between the lower edge and the upper edge (e.g., so as to leave a void space between mounting plate 106 and the lower edge and a void space between mounting plate 106 and the upper edge). The lower edge of shield wall 108 may include a lip 114. Lip 114 may be beveled or angled (e.g., at 45 degrees) outward from shield wall 108. This makes cutting or sawing at the lower edge of shield wall 108 difficult.

Figure 1B:
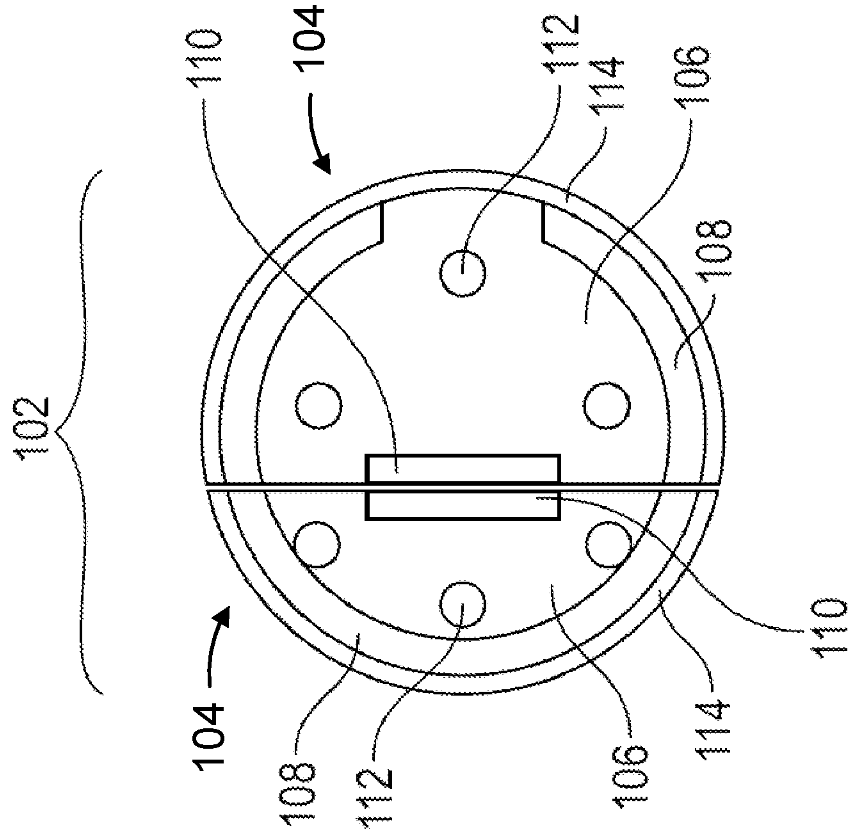
FIG. 1B is a diagram of a top view of the set of hasp brackets included in the example hasp assembly of FIG. 1A.

FIG. 1B is a diagram of a top view of the set of hasp brackets included in the example hasp assembly of FIG. 1A. As shown in FIG. 1B, an aperture 112 is located in an area of mounting plate 106 that is bounded by shield wall 108 and an inward edge of mounting plate 106. For example, the aperture 112 may be bounded by shield wall 108 and a plane defined by shackle aperture member 110. In this way, when hasp assembly 102 is in a locked configuration (e.g., by a hidden-shackle padlock), shield walls 108 of hasp brackets 104 define a circular wall that bounds (e.g., surrounds) apertures 112, thereby protecting mounting hardware received in apertures 112 from tampering. Moreover, in the locked configuration, the hidden-shackle padlock is nested within the circular wall defined by shield walls 108, and thus covers apertures 112, thereby providing additional protection to mounting hardware received in apertures 112 from tampering.

As indicated above, FIGS. 1A and 1B are provided as examples. Other examples can differ from what is described with regard to FIGS. 1A and 1B.

Figure 2A:
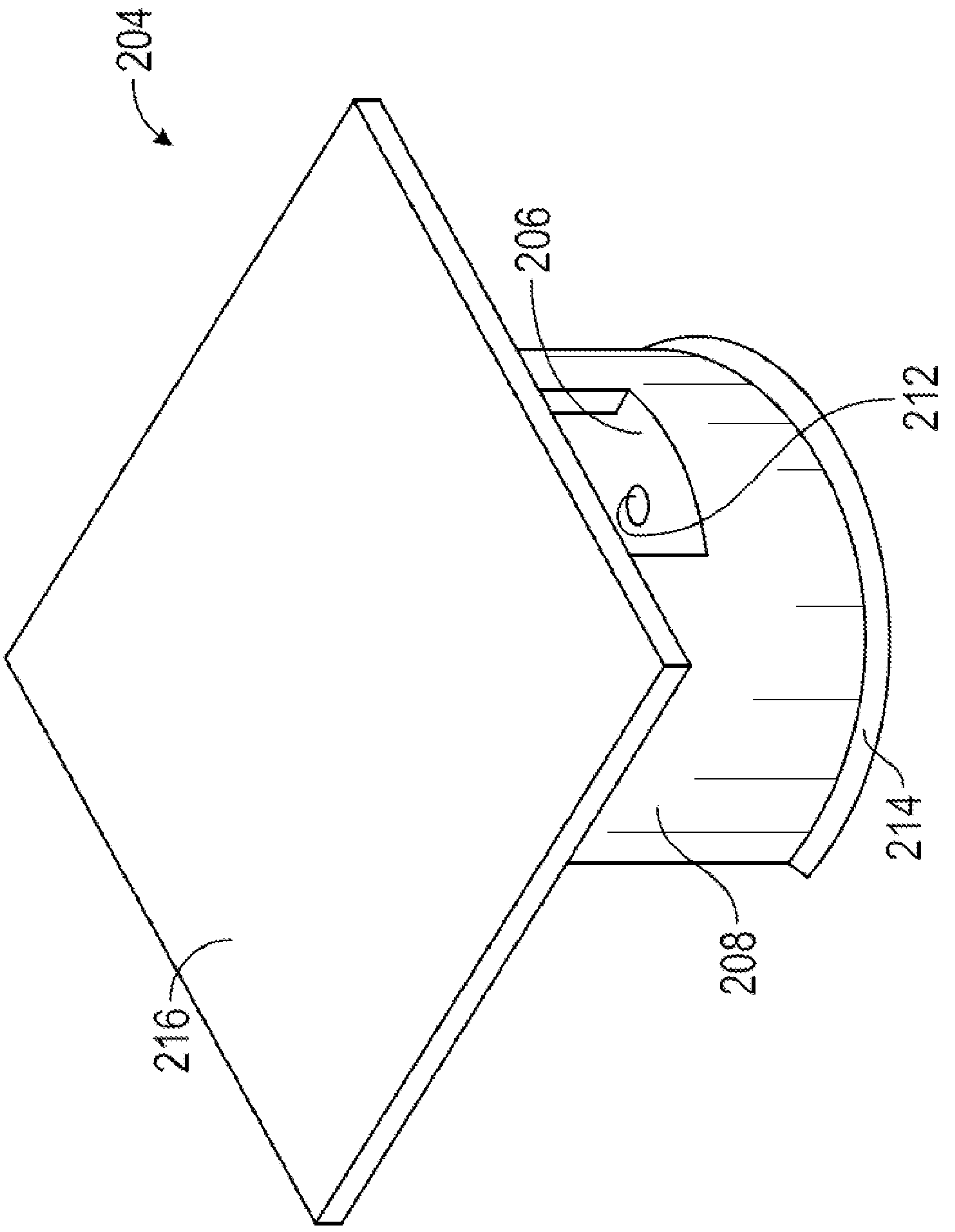
FIG. 2A is a diagram of a perspective view of an example hasp bracket.

FIG. 2A is a diagram of a perspective view of an example hasp bracket 204. As shown in FIG. 2A, hasp bracket 204 may include a mounting plate 206, a shield wall 208, a shackle aperture member 210, one or more apertures 212, and a lip 214 similar to those described in connection with FIGS. 1A and 1B. In addition, hasp bracket 204 may include a cover plate 216.

Cover plate 216 may be composed of steel (e.g., hardened steel) or another metal. Cover plate 216 may be attached (e.g., by welds) to hasp bracket 204 at an upper edge of shield wall 208. Cover plate 216 may extend orthogonally to shield wall 208 (e.g., parallel to mounting plate 206) so as to cover hasp bracket 204 (e.g., cover mounting plate 206, cover an internal area of hasp bracket 204 that is defined by shield wall 208, and/or the like). Cover plate 216 may extend beyond (e.g., overhang) a periphery of hasp bracket 204 defined by shield wall 208. In addition, cover plate 216 may extend beyond (e.g., overhang) an inward edge of hasp bracket 204 (e.g., a straight edge of mounting plate 206). In this way, when hasp bracket 204 is in a locked configuration with another hasp bracket (e.g., by a hidden-shackle padlock), cover plate 216 also covers the other hasp bracket (e.g., a mounting plate of the other hasp bracket, an internal area of the other hasp bracket that is defined by a shield wall of the other hasp bracket, and/or the like).

Figure 2B:
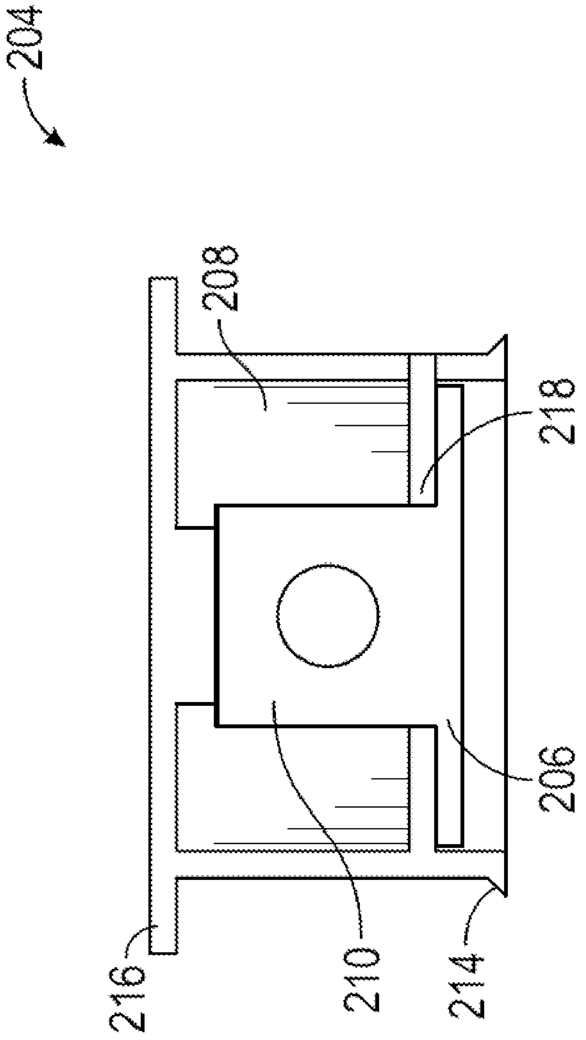
FIG. 2B is a diagram of a side view of the example hasp bracket of FIG. 2A.

FIG. 2B is a diagram of a side view of example hasp bracket 204. As shown in FIG. 2B, mounting plate 206 and shield wall 208 may be separate components (e.g., not attached). For example, mounting plate 206 may be engaged with shield wall 208 or disengaged from shield wall 208. In this case, shield wall 208 may include a shelf 218 extending from an inward surface of shield wall 208 that abuts mounting plate 206 when mounting plate 206 is engaged with shield wall 208. Shelf 218 may include apertures that are similar to those of, and align with, apertures 212 of mounting plate 206.

By including a mounting plate 206 that can be engaged with, and disengaged from, shield wall 208, hasp bracket 204 permits a hidden-shackle padlock to be introduced into an internal area (e.g., an internal void area) of hasp bracket 204 that is defined by shield wall 208 and cover plate 216. For example, a hidden-shackle padlock may be introduced into the internal area when mounting plate 206 is disengaged from shield wall 208. After introducing the hidden-shackle padlock, mounting plate 206 may be engaged with shield wall 208 (e.g., from a bottom of shield wall 208) so that shackle aperture member 210 projects into an aperture of the hidden-shackle padlock. A shackle of the hidden-shackle padlock then may be engaged with the hidden-shackle padlock (e.g., via a gap in shield wall 208) and with shackle aperture member 210, thereby affixing mounting plate 206. Hasp bracket 204 also may be included in a hasp assembly with a hasp bracket that does not include a mounting plate that can be engaged and disengaged (e.g., hasp bracket 104 of FIGS. 1A and 1B).

As indicated above, FIGS. 2A and 2B are provided as examples. Other examples can differ from what is described with regard to FIGS. 2A and 2B.

Figure 3A:
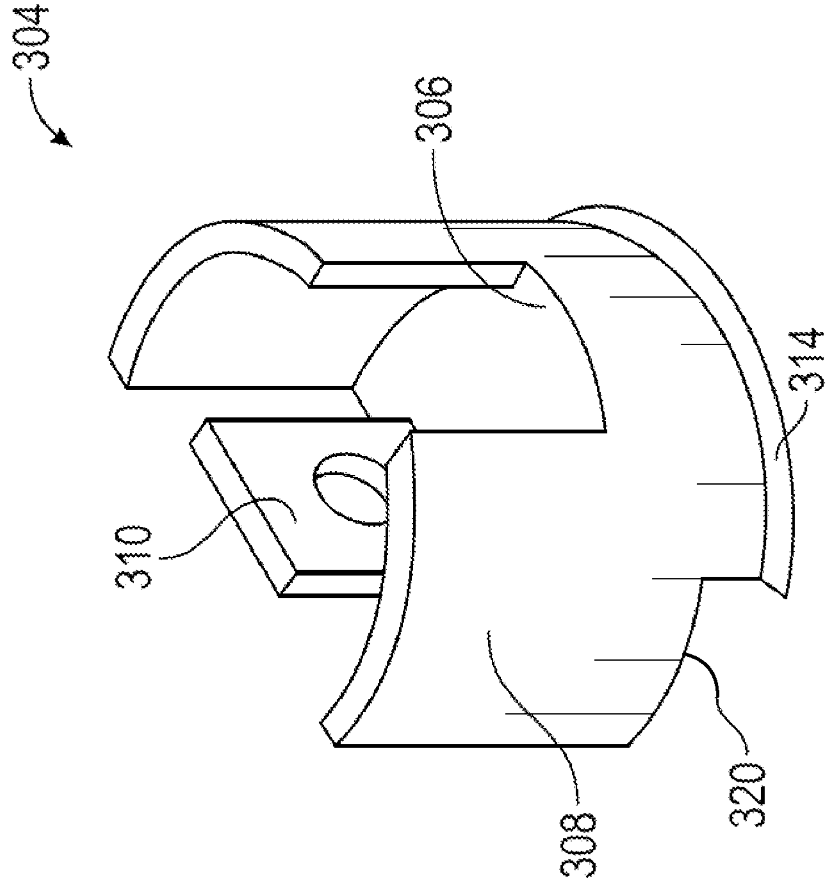
FIG. 3A is a diagram of a perspective view of an example hasp bracket.

FIG. 3A is a diagram of a perspective view of an example hasp bracket 304. As shown in FIG. 3A, hasp bracket 304 may include a mounting plate 306, a shield wall 308, a shackle aperture member 310, and a lip 314 similar to those described in connection with FIGS. 1A and 1B. In some implementations, mounting plate 306 does not include apertures (e.g., mounting plate 306 may not receive mounting hardware).

Hasp bracket 304 may include a notch 320. Notch 320 may be a gap (e.g., a void space) in shield wall 308. For example, notch 320 may be a gap at a lower edge of shield wall 308. The gap may extend from the lower edge upwards to mounting plate 306, such that mounting plate 306 defines a lower edge at a portion of hasp bracket 304.

Figure 3B:
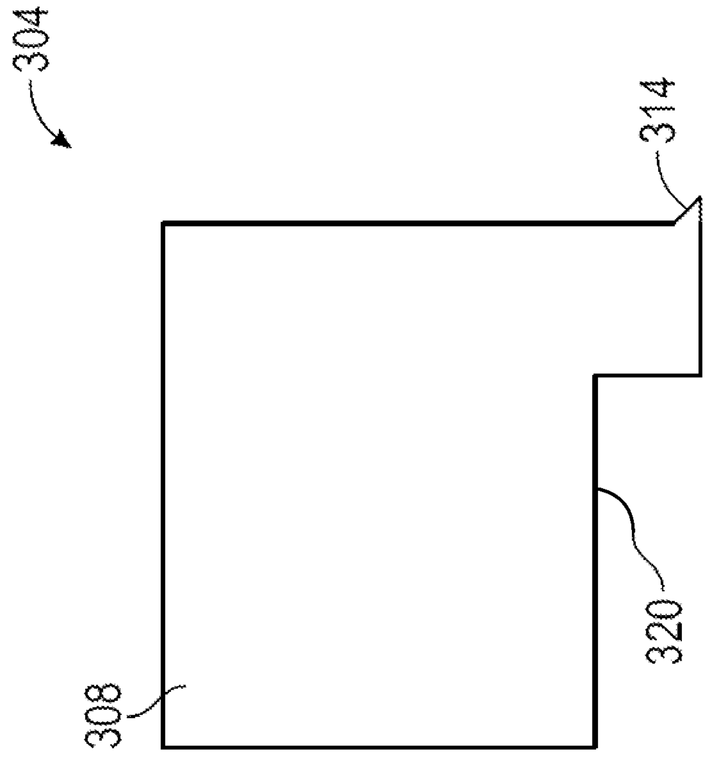
FIG. 3B is a diagram of a side view of the example hasp bracket of FIG. 3A.

FIG. 3B is a diagram of a side view of example hasp bracket 304. As shown in FIG. 3B, notch 320 may extend from an inward edge of shield wall 308 towards an outward edge of shield wall 308. Thus, a lower edge of hasp bracket 304 may have a stepped structure due to notch 320.

Figure 3C:
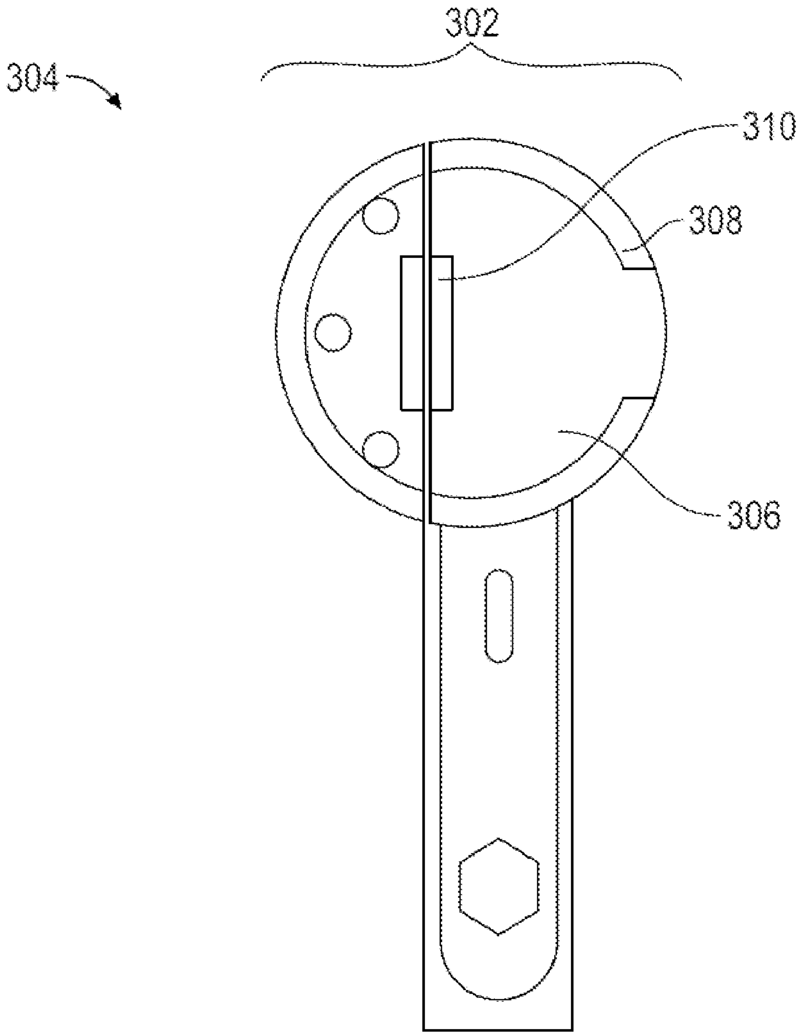
FIG. 3C is a diagram of an example hasp assembly, including the example hasp bracket of FIG. 3A, in use with a handle lock.

FIG. 3C is a diagram of an example hasp assembly 302 in use with a handle lock. In some implementations, the handle lock may be a server cabinet handle lock that pivots from a locked position, whereby the handle lock is disposed in a housing (e.g., the handle lock cannot be accessed to be turned), to an unlocked position, whereby the handle lock projects from the housing (e.g., the handle lock can be accessed to be turned). Hasp assembly 302 may include hasp bracket 304 and a hasp bracket that does not include a notch (e.g., hasp bracket 104 of FIGS. 1A and 1B).

Hasp assembly 302 may be mounted to a surface (e.g., an exterior of a server cabinet) using apertures for mounting hardware included in the hasp bracket that does not include the notch (e.g., because hasp bracket 304 may not include such apertures). Hasp assembly 302 may be mounted to the surface such that the handle lock is received in notch 320 of hasp bracket 304, and thus covered by hasp bracket 304 (e.g., when the handle lock is in the locked position). Hasp assembly 302 may be secured by a hidden-shackle padlock, as described herein, thereby affixing hasp bracket 304 (e.g., otherwise, hasp bracket 304 may be free). In this way, the handle lock cannot pivot from the locked position to the unlocked position until the hidden-shackle padlock is unlocked and hasp bracket 304 is moved so as not to cover the handle lock.

As indicated above, FIGS. 3A, 3B, and 3C are provided as examples. Other examples can differ from what is described with regard to FIGS. 3A, 3B, and 3C.

The foregoing disclosure provides illustration and description, but is not intended to be exhaustive or to limit the implementations to the precise form disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A bracket, comprising:

a mounting plate with a shield wall orthogonally attached, the mounting plate being positioned between a lower edge of the shield wall and an upper edge of the shield wall, and a notch at the lower edge of the shield wall to receive a handle lock such that the handle lock is covered by the bracket, wherein the notch includes a void space in the shield wall.

2. The bracket of claim 1, wherein the notch extends from the lower edge to the mounting plate causing the mounting plate to define the lower edge at a portion of the bracket.

3. The bracket of claim 1, wherein the notch extends from an inner edge of the shield wall towards an outward edge of the shield wall.

4. The bracket of claim 1, wherein the lower edge of the bracket includes a stepped structure.

5. The bracket of claim 1, wherein the bracket, when engaged with the handle lock via the notch, prevents the handle lock from pivoting from a locked position to an unlocked position.

6. The bracket of claim 5, wherein the bracket is affixed to the handle lock by a hidden-shackle padlock.

7. The bracket of claim 1, wherein the mounting plate and the shield wall are separable components.

8. A hasp assembly, comprising:

a cover plate;

a first hasp bracket including a first shield wall and a first mounting plate orthogonally coupled to the first shield wall, the first mounting plate including a first bolt aperture member extending from an inward edge of the first mounting plate, a notch on the first shield wall to receive a handle lock; and a second hasp bracket including a second shield wall and a second mounting plate orthogonally coupled to the second shield wall, the second mounting plate including a second bolt aperture member extending from an inward edge of the second mounting plate.

9. The hasp assembly of claim 8, wherein the second hasp bracket includes one or more apertures.

10. The hasp assembly of claim 8, wherein the notch extends from a lower edge of the first shield wall upwards into the first mounting plate.

11. The hasp assembly of claim 8, wherein the first mounting plate defines a lower edge at a portion of the first hasp bracket.

12. The hasp assembly of claim 8, wherein the hasp assembly is to be mounted to a surface such that the handle lock is received in the notch.

13. The hasp assembly of claim 8, wherein the hasp assembly interacts with the handle lock such that the handle lock is covered by the first hasp bracket.

14. The hasp assembly of claim 8, wherein the notch causes a lower edge of the first hasp bracket to include a stepped structure.

15. A hasp assembly, comprising:

a first hasp bracket including a first shield wall and a first mounting plate orthogonal to the first shield wall, the first mounting plate including a first bolt aperture member extending from an inward edge of the first mounting plate, the first shield wall including a notch extending from a lower edge of the first shield wall to the first mounting plate, and wherein the hasp assembly, when engaged with a handle lock, prevents the handle lock from pivoting from a locked position to an unlocked position until the first hasp bracket is moved from covering the handle lock; and a second hasp bracket including a second shield wall and a second mounting plate orthogonal to the second shield wall.

16. The hasp assembly of claim 15, wherein the notch is to receive the handle lock such that the handle lock is covered by the first hasp bracket.

17. The hasp assembly of claim 15, wherein the second hasp bracket includes one or more apertures to receive mounting hardware.

18. The hasp assembly of claim 15, wherein the second shield wall defines a circular periphery of the second hasp bracket.

19. The hasp assembly of claim 15, wherein the first mounting plate is positioned between the lower edge of the first shield wall and an upper edge of the first shield wall.

20. The hasp assembly of claim 15, further comprising:

a cover plate.

* * * * *